3,495,997
MAGNESIUM OXYCHLORIDE CEMENT
Cameron W. Sherry, Dorion, Quebec, Canada, assignor to Domtar Limited, Montreal, Quebec, Canada, a company of Canada
Filed Oct. 17, 1966, Ser. No. 587,240
Claims priority, application Canada, Oct. 20, 1965, 943,408
Int. Cl. C04b 7/00; C08b 21/00, 23/00
U.S. Cl. 106—106
7 Claims

ABSTRACT OF THE DISCLOSURE

Dimensionally stable neat magnesium oxychloride cements are made from compositions consisting essentially of partially calcined dolomite, magnesium chloride and water. The compositions are defined in terms of active MgO, $MgCl_2$ and $H_2O$ and are limited to those represented by points within a small triangular area on a triangular coordinate diagram.

---

Figure 1:
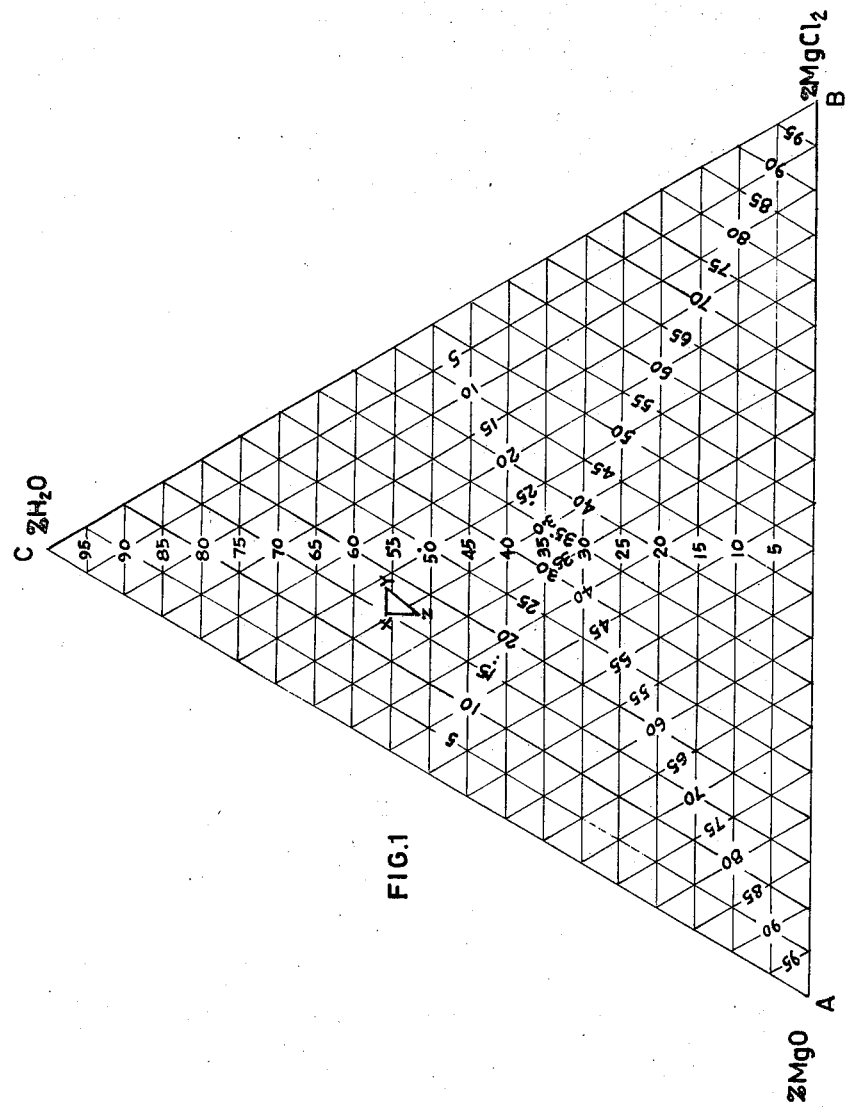

The present invention relates to an improved magnesium oxychloride cement and more particularly, to a neat magnesium oxychloride cement prepared from a mixture of $MgCl_2$, $H_2O$ and MgO contained in PCD (partially calcined dolomite). As used herein the term "dolomite" is intended to mean any dolomitic ore that contains $MgCO_3$ and $CaCO_3$ in at least about a ½:1 and up to about a 2:1 ratio.

PCD has been suggested as a source of MgO to be used in the preparation of magnesium oxychloride cement. Although PCD has a decided economical advantage of also containing as a much desired filler, uncalcined $CaCO_3$, the calcination of $MgCO_3$ to MgO must be carried out under close temperature control to avoid calcining $CaCO_3$ to CaO which is known to disrupt the stability of the cement. While the presence of an intolerable amount of CaO is one of the main reasons known for the considerable dimensional change the cement undergoes to the extent that cracking and warping occurs, it is by no means the only reason and a review of the literature indicates that it has been attributed to other factors as well. In spite of a number of claims that a dimensionally stable cement has been obtained, a neat magnesium oxychloride cement containing PCD as the source of MgO has not been found which would maintain its dimensional stability with age. In attempts to overcome the weaknesses of such cements additives as stabilizers have been tried, but since many of the results obtained thus far are inconclusive and the cost of production increases considerably, the advantages accruing from their use do not always justify the higher cost.

It is an object of the present invention, therefore, to provide a neat magnesium oxychloride cement.

It is another object of the present invention to provide a dimensionally stable neat magnesium oxychloride cement prepared from a mixture of $MgCl_2$, $H_2O$ and MgO contained in PCD.

In accordance with the present invention it has been found that a dimensionally stable neat magnesium oxychloride cement can be produced if $MgCl_2$, $H_2O$ and PCD containing active MgO are mixed in a proper mixing ratio. Since PCD normally contains two kinds of MgO, a dead burned MgO, which does not take part in the chemical reaction, and an active MgO, which is available for cement formation, any formulation of the three ingredients must be based on the amount of $MgCl_2$, $H_2O$ and active MgO. Prior to this invention, however, the amount of active MgO in PCD was not accurately determined; yet, one of the critical properties of the cement is the ratio of active MgO contained in PCD to the $MgCl_2$. Therefore, in order to establish the formulation which results in the satisfactory cement it is essential first to make an accurate determination of the amount of active MgO in the PCD. This is accomplished by a series of measurements which include measuring the amount of $CO_2$ and $H_2O$ in the PCD (calcining at 1000° C.), the amount of free $H_2O$ (dry at 100° C.), the amount of CaO by a conductivity test and finally the amounts of Ca and Mg (by titrating with ethylenediaminetetraacetic acid, EDTA). From these measurements the true amount of MgO available for magnesium oxychloride cement formation can be calculated provided the PCD is substantially free from free CaO (the amount of CaO not exceeding 1% by weight of MgO).

Only selected mixtures within the limits of formulation of about 26.5–about 31.8% MgO; about 14.7–about 17.8% $MgCl_2$; about 55.7–about 51.5% $H_2O$; (the percentages being weight percentages based on the total weight of the active constituents) were found to produce a dimensionally stable cement whereas other mixtures produced a cement which was not substantially free from dimensional changes and/or warpage. The dolomite used in the present invention as the source of MgO was obtained from a deposit at Canaan, Mass., and for the most part, the $MgCO_3$ and $CaCO_3$ are found in substantially a 1:1 molar ratio.

In converting the $MgCO_3$ to MgO the dolomite is partially calcined at a temperature from about 750° to 1050° C., preferably at 900° C. Although this temperature range is suitable for calcining the dolomite used in the present invention without disturbing the $CaCO_3$ it may vary for each dolomite deposit. Since the chemical activity of the MgO is one of the main controlling factors in the making of neat cement, care must be taken, therefore, to ensure that the dolomite is not calcined at too high or too low a temperature. If the activity of the MgO is too high or too low, the setting of the cement will be adversely affected.

For the best results the magnesium oxychloride cement is made by first preparing an aqueous $MgCl_2$ solution of known strength and to a known volume of this solution, adding an amount of PCD containing a sufficient amount of active MgO to give the proper mixing ratio. A freshly prepared PCD is preferred and by the term "freshly prepared" as applied to PCD is meant PCD used within about four months of calcination. If the PCD is to be stored for any length of time until use it should be confined to a closed container; otherwise, hydration may occur. It is also desirable to use a not too coarse PCD, preferably of a particle size not exceeding 200 mesh. After the mix has been worked up to the proper consistency the cement is poured into a mold, or otherwise shaped, agitated, and allowed to set, preferably, at a temperature of about 70° F. and a humidity of about 50%. Too high a humidity, exceeding above about 85%, should be avoided. Although the cement generally hardens in about 7 to 9 hours, its strength increases with time and, thus, it may often be desirable to cure the cement for a period of at least about 3 days to achieve a high degree of strength.

The following is an example of the preparation of a typical neat cement having the formulation: 27.3% MgO; 55.5% H$_2$O; 17.2% MgCl$_2$.

A magnesium chloride solution was prepared by dissolving 605 gm. of MgCl$_2$·6H$_2$O crystals to make 1 l. of solution. The solution was then filtered to remove impurities such as the double salt KCl·MgCl$_2$·6H$_2$O. 515 ml. of the MgCl$_2$ solution was placed in a mixing bowl at a temperature of about 70° F. and to this was added 1000 gm. of freshly prepared PCD containing an accurately determined amount of 232 gm. of MgO. The ingredients were then mixed for approximately five minutes with the aid of a mixer and the speed was varied so as to obtain a cement of smooth consistency. After the mixing was completed the cement was poured into molds and any large air bubbles were removed from the cement by placing the molds on a mechanical shaker until the bubbles stopped forming. The molds were then cured in an atmosphere of air at a temperature of about 70° F. and a humidity of about 50%. During the first 24 hours of curing after final setting the percent maximum contraction was measured in accordance with a slightly modified method of that given in ASTM Designation: C252-52. After one year of curing the percent linear expansion was measured in accordance with a slightly modified method of that given in ASTM Designation: C253-52. Also, after one year the warpage was measured with a micrometer over a six inch span to ten thousandths of an inch by placing a sample, bottom surface face downward on a cradle with knife edges, the knife edges being exactly 6″ apart.

Figure 2:
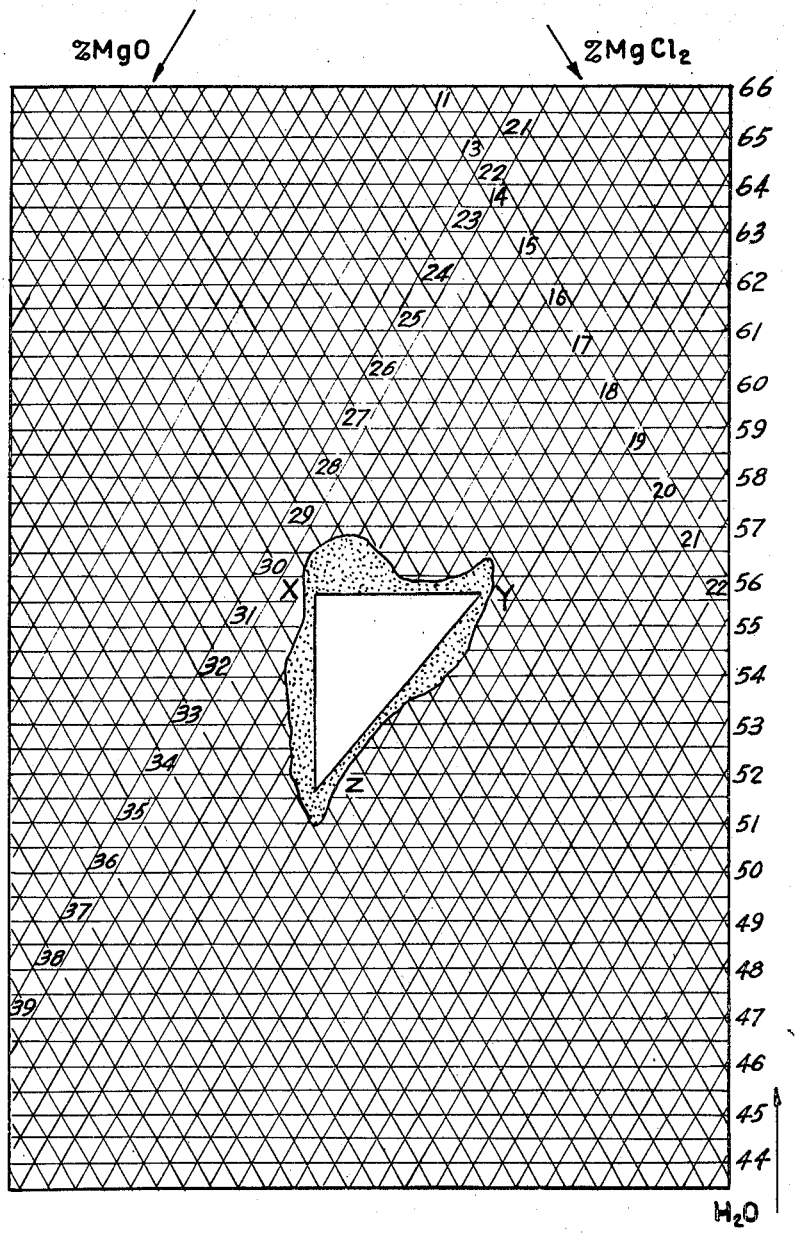

The results of these tests are reported hereinafter in a table in which a comparison is made between the properties namely, warpage, expansion and maximum contraction, of cements having formulations lying within the proposed range for a stable cement and cements having formulations lying outside the proposed range; but first, reference is had to the accompanying FIGS. 1 and 2 which illustrate graphically on triangular graphs the region of neat cement. FIG. 1 is an entire triangular graph illustrating the small region of good cement after one year of curing and FIG. 2 is a partial triangular graph illustrating an enlargement thereof with a fringe area. As can be seen in FIG. 1 each of the vertices is labeled with one of the three main constituents and any point chosen on the graphs always represents 100%. The top vertex C represents 100% H$_2$O whereas the line AB opposite vertex C represents 0% H$_2$O. Every line parallel to line AB represents a certain percentage of H$_2$O with the percentage increasing from line AB to vertex C. Similarly, the remaining vertices A and B represent 100% MgO and MgCl$_2$, respectively, and every line parallel to line AC and line BC represents a certain percentage of MgO and MgCl$_2$, respectively.

The enclosed triangle XYZ represents the optimum area of stable cement and any point within the limits of this triangle represents a definite composition, percentage by weight of the three main constituent materials. Compositions within the said triangle XYZ are those of this invention, points X, Y and Z being defined respectively as 26.5% MgO, 17.8% MgCl$_2$, 55.7% H$_2$O; 20.6% MgO, 14.7% MgCl$_2$, 55.7% H$_2$O; and 31.8% MgO, 16.7% MgCl$_2$ and 51.5% H$_2$O; and the centre of the area, which represents the optimum formulation, is about 29.2% MgO; about 16.3% MgCl$_2$; about 54.5% H$_2$O. Although the dotted area in FIG. 2 represents a fringe area outside the acceptable region, it is an area of potentially good cement and under extraordinary close quality control a stable cement may result.

In the following table the physical properties, namely, warpage, expansion and maximum contraction, of compositions within the enclosed triangle XYZ are compared with compositions outside the same. All of the compositions are prepared in accordance with the procedure described in the given example and tested for dimensional changes and warpage in a similar manner.

TABLE

| Cement Formulations (Within acceptable area) | | | Warpage (over a 6 inch span to ten thousandths of an inch) | Expansion (percent change) | Contraction (percent change) |
| --- | --- | --- | --- | --- | --- |
| MgO | MgCl$_2$ | H$_2$O | | | |
| 27.1 | 17.4 | 55.5 | 69 | 0.235 | 0.01 |
| 30.4 | 15.1 | 54.5 | −45 | 0.110 | 0.06 |
| 29.4 | 15.1 | 55.5 | −76 | 0.120 | 0.01 |
| 28.4 | 16.1 | 55.5 | −33 | 0.210 | 0.00 |
| (Just outside acceptable area) | | | | | |
| 26.3 | 18.2 | 55.5 | 301 | 0.300 | 0.01 |
| 27.3 | 18.1 | 54.6 | 415 | 0.340 | 0.01 |
| 28.3 | 18.2 | 53.5 | 246 | 0.330 | 0.04 |
| 30.4 | 18.1 | 51.5 | 9 | 0.320 | 0.07 |
| (Further outside acceptable area) | | | | | |
| 34.2 | 20.2 | 45.6 | 95 | 0.480 | 0.03 |
| 33.2 | 19.2 | 47.6 | 395 | 0.545 | 0.04 |
| 34.1 | 17.3 | 48.6 | 37 | 0.445 | 0.07 |
| 34.3 | 19.1 | 46.6 | −52 | 0.395 | 0.02 |

The table reveals that the dimensional changes of the cements within the optimum area fall within the test limits set by ASTM, namely, 0.25% expansion and 0.25% maximum contraction. It will also be observed that the warpage is negligible, less than ±80/10,000 ths. of an inch over a 6″ span. Comparing the above properties of the cement outside the optimum area, it will be observed that the dimensional changes and warpage of the latter are considerably higher.

Another important feature of the magnesium oxychloride cement which has been established is its change in molecular structure with time. From X-ray diffraction patterns of different mixes of the cement I have found that the best cements are formed when the pattern of 5MgO.MgCl$_2$.13H$_2$O is the only one evident on the X-ray trace several weeks after the final set. A cement of questionable properties is formed whenever the X-ray trace indicates the presence of either Mg(OH)$_2$ or 3MgO.MgCl$_2$.11H$_2$O within the first few weeks after the final set. After the cement has aged, somewhat, the presence of 3MgO.MgCl$_2$.11H$_2$O may be tolerated without any apparent change in the physical properties during the period of rearrangement. The presence of a protective surface skin of the formula 2MgCO$_3$.Mg(OH)$_2$.MgCl$_2$.6H$_2$O was also indicated on the cement by an X-ray trace after one year. In the case of the cement prepared according to this invention all cements first showed a 5MgO.MgCl$_2$.13H$_2$O pattern, and after one year an X-ray pattern indicated the presence of 5MgO.MgCl$_2$.13H$_2$O; 3MgO.MgCl$_2$.11H$_2$O; 2MgCO$_3$.Mg(OH)$_2$.MgCl$_2$.6H$_2$O.

While the results of the tests indicate that by selecting the proper mix it is possible to make a dimensionally stable neat magnesium oxychloride cement with MgO contained in PCD, nevertheless, it has been found desirable to make the cement in a plant under close quality control. By the term "dimensionally stable" as applied to the resulting cement is meant a cement which is substantially free from dimensional changes and warpage after final setting, the properties of maximum contraction, linear expansion and warpage falling within the test limits established herein. The cement of the present invention is used to the best advantage in indoor applications.

While the present invention is primarily concerned with a neat magnesium oxychloride cement it will, of course, be apparent that it is not limited to a neat cement, but that the cement can also be used with additives well known in the art if it is so desired.

I claim:

1. An improved magnesium oxychloride cement composition consisting essentially of partially calcined dolomite, magnesium chloride, and water, said partially calcined dolomite being substantially free of calcium oxide, the composition of said cement in terms of percentages of active MgO, $MgCl_2$ and $H_2O$, based on the total weight of the said three ingredients, being represented by any point on a triangular coordinate diagram within a triangle having its apexes defined by the points 26.5% MgO, 17.8% $MgCl_2$, 55.7% $H_2O$; 29.6% MgO, 14.7% $MgCl_2$, 55.7% $H_2O$; and 31.8% MgO, 16.7% MgCl and 51.5% $H_2O$.

2. A cement as claimed in claim 1 wherein said MgO is present in the amount of about 29.2%, said $MgCl_2$ is present in the amount of about 16.3% and said $H_2O$ is present in the amount of about 54.5%.

3. A cement as claimed in claim 1 wherein the dolomite has a particle size of less than 200 mesh.

4. A cement as claimed in claim 2 wherein the dolomite has a particle size of less than 200 mesh.

5. A process for producing an improved magnesium oxychloride cement which comprises preparing an aqueous solution of $MgCl_2$ and mixing with said aqueous solution active MgO contained in a partially calcined dolomite substantially free of calcium oxide in proportions such that the resulting composition is represented by any point on a triangular coordinate diagram within a triangle having its apexes defined by the points 26.5% MgO, 17.8% $MgCl_2$, 55.7% $H_2O$; 29.6% MgO, 14.7% $MgCl_2$, 55.7% $H_2O$; and 31.8% MgO, 16.7% $MgCl_2$ and 51.5% $H_2O$, the percentages being weight percentages based on the total weight of the said three ingredients.

6. A process as claimed in claim 5 wherein said aqueous solution and active MgO are mixed in proportions such that the resulting mixture contains about 29.2% of MgO, about 16.3% of $MgCl_2$ and about 54.5% of $H_2O$.

7. A process as claimed in claim 5 wherein said dolomite has a particle size of less than 200 mesh.

References Cited

UNITED STATES PATENTS

| | | | |
|---|---|---|---|
| 2,745,759 | 5/1956 | Pavlish | 106—106 |
| 2,702,753 | 2/1955 | Dickey | 106—88 |
| 1,634,505 | 7/1927 | McCaughey | 106—106 |

HELEN M. McCARTHY, Primary Examiner

W. T. SCOTT, Assistant Examiner